(12) United States Patent
Keefe et al.

(10) Patent No.: US 9,096,012 B2
(45) Date of Patent: *Aug. 4, 2015

(54) SURFACE TEXTURING USING ENGINEERED STRUCTURES

(75) Inventors: Andrew C. Keefe, Encino, CA (US);
Christopher P. Henry, Thousand Oaks, CA (US); Guillermo A. Herrera, Winnetka, CA (US); Geoffrey P. McKnight, Los Angeles, CA (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/491,598

(22) Filed: Jun. 8, 2012

(65) Prior Publication Data

US 2012/0241312 A1    Sep. 27, 2012

Related U.S. Application Data

(63) Continuation-in-part of application No. 12/761,709, filed on Apr. 16, 2010, now abandoned.

(51) Int. Cl.
*C25B 9/00* (2006.01)
*B29C 59/02* (2006.01)
*B29C 59/18* (2006.01)
*B44C 1/00* (2006.01)

(52) U.S. Cl.
CPC ............... *B29C 59/02* (2013.01); *B29C 59/18* (2013.01); *B44C 1/005* (2013.01); *Y10T 428/24446* (2015.01)

(58) Field of Classification Search
CPC ........ B29C 59/02; B29C 59/18; B44C 1/005; Y10T 428/24446
USPC ........................................................ 428/152
See application file for complete search history.

(56) References Cited

U.S. PATENT DOCUMENTS

2010/0116430 A1* 5/2010 Yang et al. ............... 156/275.7
2010/0234947 A1* 9/2010 Ben Rubi et al. .......... 623/11.11

* cited by examiner

*Primary Examiner* — William P Watkins, III

(57) ABSTRACT

Active texturing systems adapted for selectively and reversibly modifying the texture of a surface utilizing a plurality of discrete mechanisms in communication with the reconfigurable structure.

16 Claims, 6 Drawing Sheets

SURFACE TEXTURING USING ENGINEERED STRUCTURES

CROSS REFERENCE TO RELATED APPLICATIONS

The present application claims priority to and continues in part from U.S. application Ser. No. 12/761,709 entitled "ASSEMBLY FOR AND METHOD OF FORMING LOCALIZED SURFACE WRINKLES" and filed on Apr. 16, 2010, the entire scope of which is hereby incorporated by reference.

BACKGROUND OF THE INVENTION

1. Field of the Invention

The present disclosure generally relates to systems for and methods of surface texturing. More particularly, the invention pertains to a system for and method of actively modifying a surface texture using engineered systems comprising an array of discrete mechanisms and more preferably, employing active material actuation.

2. Discussion of Prior Art

Surface texturing has long been used to affect, enable, or control various physical interaction (i.e., aspects, or conditions) of a system, including surface adhesion, reflection, coefficients of friction, structural colors, and metrology. Traditionally, once molded, machined, constructed, or otherwise produced physical systems often present set surface textures that may be advantageous in one or more of the afore-mentioned aspects while presenting disadvantages in others. As a result, active texturing systems have been developed that enable a surface texture to be modified to better serve multiple functions when desired. Conventional active systems, including various combinations of rigid structures and elastic structures having stored therein sufficient energy to buckle the surface of the structure, have been inefficient, overly complex, and in some cases limited in capability and extent.

BRIEF SUMMARY OF THE INVENTION

In response to the afore-mentioned concerns, the present invention recites a more efficient system for and method of actively modifying the texture of a surface, and more specifically, to a system for and method of modifying surface texture utilizing engineered systems, and preferably but not necessarily active material actuation. As a result, the invention is useful for modifying the physical interactions of the system that are affected, enabled, or controlled by surface texture. More particularly, the present invention is useful for modifying, among other physical interactions, the reflective, thermal, fluidic, electro-magnetic receptive, tactile, frictional, acoustic, emissive, or aesthetic aspects/capabilities thereof. In a preferred embodiment, the invention is useful for modifying the aesthetics or feel of a surface, so as to effect a visual or haptic alert. In another, the invention is useful for selectively reducing glare, and other reflections/deflections of radiation/emission. Finally, by employing engineered systems and active material actuation, the invention presents a less complex surface texturing solution that reduces packaging requirements, complexity, and noise (both with respect to acoustic and EMF).

In general, the invention presents a system for selectively and dynamically modifying the texture of an exposed surface. The system includes a reconfigurable structure, such as an elastic sheet, defining the exposed surface, an array of discrete mechanisms, such as a plurality of hermetically sealed cells, each operable to reconfigure a portion of the surface, so as to cooperatively modify the texture of the surface, and an actuator, entrapped gas, or substance communicatively coupled to each mechanism and operable to activate and deactivate the mechanism, so as to cause the mechanism to reconfigure said portion.

The disclosure, including references to vehicular applications, as well as exemplary structures, discrete mechanisms, and actuators may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIGS. 2a,b are elevations of an active texturing system including a plurality of partially enclosed core mechanisms drivenly coupled to a reconfigurable structure in the deactivated state (a), and activated/textured state (b), in accordance with a preferred embodiment of the invention;

FIGS. 3a,b are elevations of an active texturing system including completely enclosed hermetically sealed cells drivenly coupled to a reconfigurable structure in the deactivated state (a), and activated/textured state (b), in accordance with a preferred embodiment of the invention;

DETAILED DESCRIPTION OF THE INVENTION

The following description of the preferred embodiments is merely exemplary in nature and is not intended to limit the invention, its application, or uses. As described and illustrated herein, the present invention concerns a structured material system 10 for and method of selectively and reversibly modifying the texture of a surface 12 utilizing actuatable arrays of discrete mechanisms 14 (FIGS. 1-9). The mechanisms 14 are shiftable between forms, cooperatively act to affect the texture, and more preferably, are variably actuatable to effect one of a plurality of available changes in surface texture. It is appreciated that the benefits of the system 10 can be realized across many applications, interacting with different physical phenomena over a broad range of texture changes; for example, the characteristic change may be on the order of microns for one physical phenomenon and centimeters for another, e.g., diffraction and friction, respectively. A variety of systems 10 suited to different physical interactions and different applications are presented herein. For instance, where thermally applicable, the system 10 may be constructed in such a way that the modification in texture is on the order of microns or centimeters; while, another system 10 may only be capable of a more narrow modification, so as to interact both thermally and optically (variable diffusivity).

Figure 1:
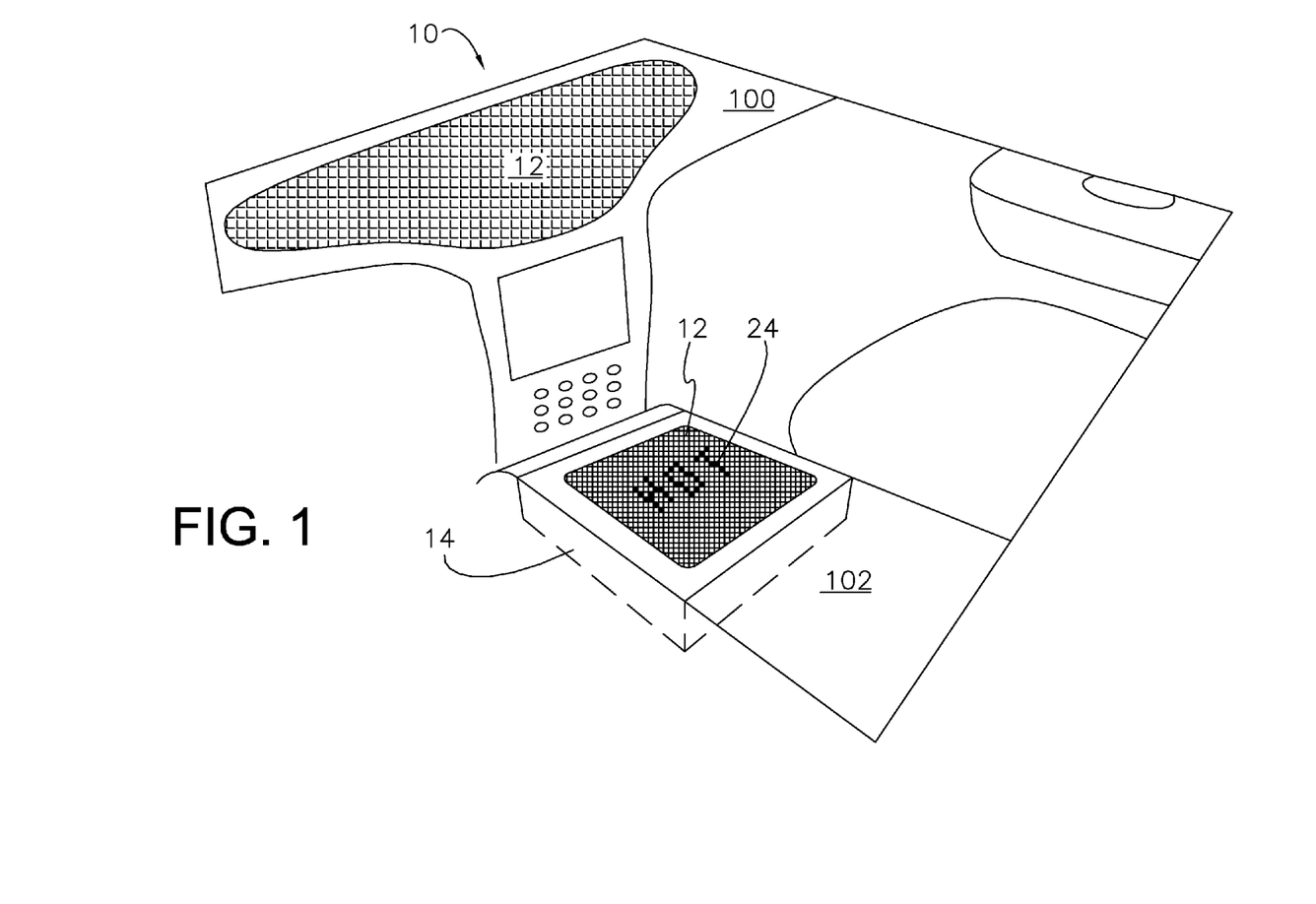
FIG. 1 is a perspective view of the interior cabin of a vehicle, particularly illustrating a controlled texturing system including actively controlled textured surfaces composing the dashboard and center console, and indicia being displayed within the console texture, in accordance with a preferred embodiment of the invention.

Thus, the inventive system 10 may be used to effect an intended condition, or modify a physical interaction, characteristic, or phenomenon of the surface 12 over a wide range of applications. In FIG. 1, for example, the system 10 is shown in an automotive setting, wherein the texture of the dashboard 100 has been modified to reduce veiling glare and the texture of the center console 102 has been modified to alert a user to and reduce the contact surface area of engagement with a hot surface. With respect to the former, it is appreciated that reducing veiling glare allows lighter surface colors to be used without detriment to visibility. In other applications, it is appreciated that modification of surface texture may be used to mitigate acoustic noise, or change specularity without affecting the reflectivity of the base material. Moreover, it is appreciated that acoustics may be similarly benefited by the present invention; more particularly, in an automotive setting, wind noise may be mitigated in part by roughening interior surfaces, such as in air ventilation ducts. In yet another application, it is appreciated that modifying external body surface textures may be used to reduce drag and/or produce radar scatter. Finally, it is also appreciated that friction is directly related to surface texture, effecting skid resistance, slip resistance, and the slipperiness of surfaces.

Actuation of the structured material system 10 may employ conventional electro-mechanical devices like solenoids or motors. More preferably, however, the system 10 integrates active material (Shape Memory Alloys/Polymers, phase change materials, et cetera) actuation that makes actuation intrinsic to the system.

I. Active Material Description and Discussion

As used herein the term "active material" is defined as any material or composite that exhibits a reversible change in fundamental (i.e., chemical or intrinsic physical) property when exposed to or occluded from an activation signal. Suitable active materials for use with the present invention include but are not limited to shape memory materials that have the ability to remember at least one attribute such as shape, and this attribute can subsequently be recalled by applying an external stimulus. Exemplary shape memory materials include shape memory alloys (SMA), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers/ceramics, and high-volume paraffin wax. Among these, SMA's and EAP's in appropriate geometric form are particularly suited for use as actuators 16 herein, and, as such, are further described bellow.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudoplastically deformed and upon exposure to some higher temperature will transform to an Austenite phase, or parent phase, returning to their shape prior to the deformation.

Shape memory alloys exist in several different temperature-dependent phases. The most commonly utilized of these phases are Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensite phase and are harder, stiffer, and/or more rigid in the Austenite phase. In view of the foregoing, a suitable activation signal for use with shape memory alloys is a thermal activation signal having a magnitude sufficient to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of approximately 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two-way by nature. Application of sufficient stress when an SMA is in its Austenite phase will cause it to change to its lower modulus Martensite phase in which it can exhibit up to 8% of "superelastic" deformation. Removal of the applied stress will cause the SMA to switch back to its Austenite phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Electroactive polymers include those polymeric materials that exhibit piezoelectric, pyroelectric, or electrostrictive properties in response to electrical or mechanical fields. An example is an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, and polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material above the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether)ethylene vinyl acetate, polyethylene, poly(ethylene oxide)-poly (ethylene terephthalate), polyethylene/nylon (graft copolymer), polycaprolactones-polyamide (block copolymer), poly (caprolactone)dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

II. Exemplary Texturing Systems and Methods of Use

The system 10 presents an engineered structure in the context of controllable textures, and a framework upon which the texture is based and manipulated. The motive force behind the change in texture, as mentioned previously, may be extrinsic or intrinsic to the structure. The system 10 includes a reconfigurable thin structure 16, such as an elastic sheet, that defines the surface 12 and texture. The structure 16 may be planar or curved so as to define the exterior of a non-planar object, such as, for example, an automotive bumper, door, quarter-panel, hood, dashboard, etc. The discrete mechanisms 14 upon which the structure 16 is mounted are responsible for either inducing the texture change directly through deformation, or housing a deformable medium in such a manner that the texture changes in a specific or optimal way, when actuated. In one aspect of the invention, the structure 16 may be deformed in bulk and thereby create a specific change in the texture; while in another, the structure 16 may contain a shape-changing medium in such a position or orientation that the shape change results in a texture change. Finally, it is appreciated that the reconfigurable overlaying structure 16 and discrete mechanisms 14 may be integrally presented.

Figure 2:
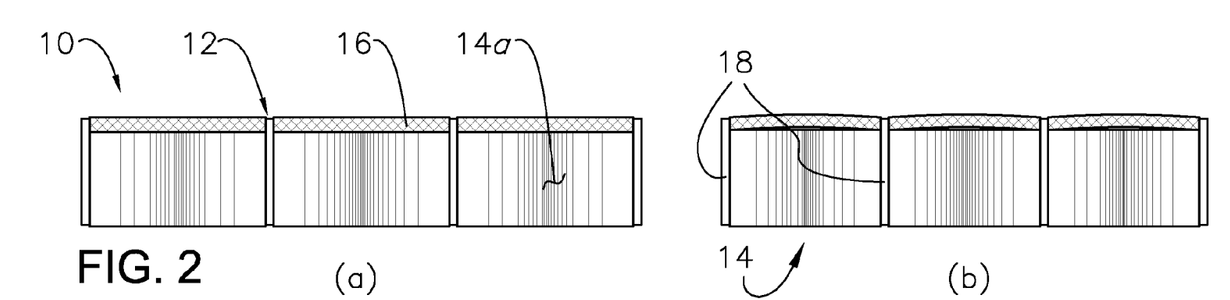
Figure 3:
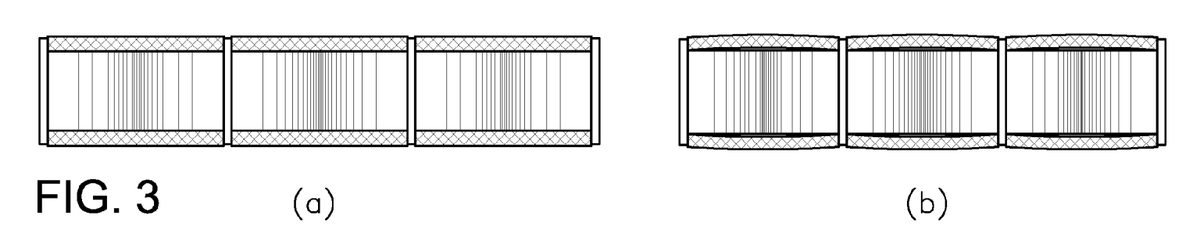

In a first embodiment shown in FIGS. 2 and 3, the mechanism 14 includes a hollow cell defining a core 14a, and the reconfigurable structure 16 presents an elastic medium, covering, or coating that overlays the cellular core mechanisms (i.e., referred to as "cells" 14 with reference to FIGS. 2-7). That is to say, the mechanisms 14 may define an array of partially enclosed spaces (FIGS. 2*a,b*) or completely enclosed hermetically sealed spaces (FIGS. 3*a,b*) defined in part by a continuous lateral wall 18 and the structure 16 on one end that cooperatively form a cell membrane. The system 10 is constructed such that longitudinal deformation of the cells 14 by means of an actuator 20 at the periphery or integrated therein induces bulging, wrinkling, or warping of the structure 16. It is appreciated that surface texturing will be dictated by the shape and spacing of the cells 14, such that the amplitude and wavelength are mainly governed by that geometry. Secondary effects may be manufactured into the surface 12, such as finer textures, wrinkles, or un-wrinkling, as a result of further deformation/actuation.

In a first example, preferably sealed cells 14 induce surface texturing by modifying the pressure of an entrapped gas 22, provided the change in pressure is sufficient to stretch or otherwise alter the membrane. It is appreciated that this embodiment may be used as an indicator of an environmental change, such as an increase in temperature, atmospheric pressure, water depth, or altitude, which would cause the gas 22 to rarify and expand the sealing membrane (i.e., walls 18, structural caps, etc.). More preferably, the indication may be configured to produce indicia 24, such as the words "Hot" or "Cold" spelled out in surface 12, using each pressurized cell as a pixel (FIG. 1). In this configuration, it is appreciated that the system 10 may be passively actuated, for example, by the heat load within the interior cabin of a vehicle. In such instances, the actuator is considered to be the motive behind the change in pressure (e.g., the vehicle cabin temperature, etc.) or otherwise cause of the passive actuation. Likewise, indication of exposure to other forms of radiation (e.g., microwaves, etc.) in a similar manner may be provided by entrapping a radiation absorbing substance (e.g., a quantity of water that boils and releases steam when exposed to microwaves) 22 within the cells 14. Alternatively, the cells 14 may also be filled fully or partially with a Negative Poisson's Ratio (NPR) material that expands (instead of contracting) laterally when elongated. Such a material could be used to make the surface texture expand under extension, and vice-versa. It is certainly within the ambit of the invention for some cells 14 to be filled fully or partially with a more conventional material (as described in other embodiments) and others filled with an NPR material to make more complex textural interactions under simple loading.

Figure 4:
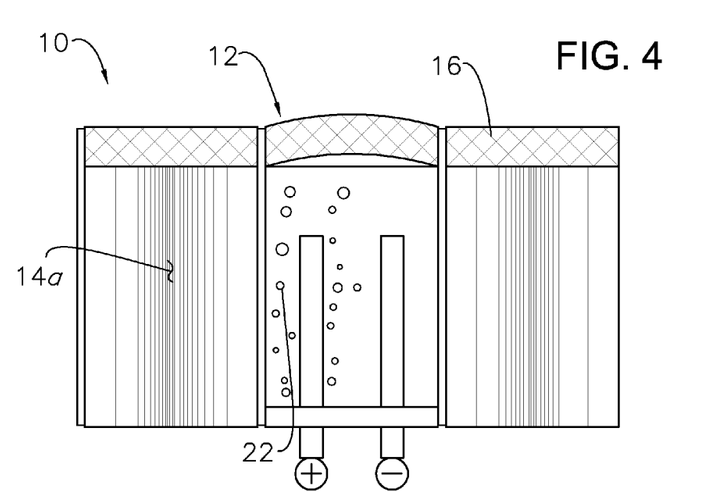
FIG. 4 is an elevation of an active texturing system shown in FIG. 3a,b, wherein the cells contain a phase-changing substance (e.g., water, paraffin wax) undergoing electrolysis, so as to release a gaseous by-product and effect bulging/wrinkling, in accordance with a preferred embodiment of the invention.

In another example, a sealed core cell 14 (FIG. 3*a,b*) may actively control texture by encapsulating a phase-change material. The phase change material can be a liquid-gas, solid-liquid or solid-solid phase change as long as the change in phase induces a change in volume. Activation of the phase change material (e.g., paraffin wax) would cause expansion or contraction of the membrane. For example, water can be made to give off hydrogen during an electrolytic reaction (FIG. 4). The gas evolution would induce reversible swelling in the membrane and could be addressed on a cell-by-cell basis (pixilation). In the case of a solid-solid phase change, the phase change material may be inside the cells 14 and behave as described or comprise the structure 16 that defines the texture. In the latter case, where the phase change material is on the surface 12, the cells 14 serve mainly to address the surface and induce phase change and thus surface texture change only to the desired area.

Figure 5:
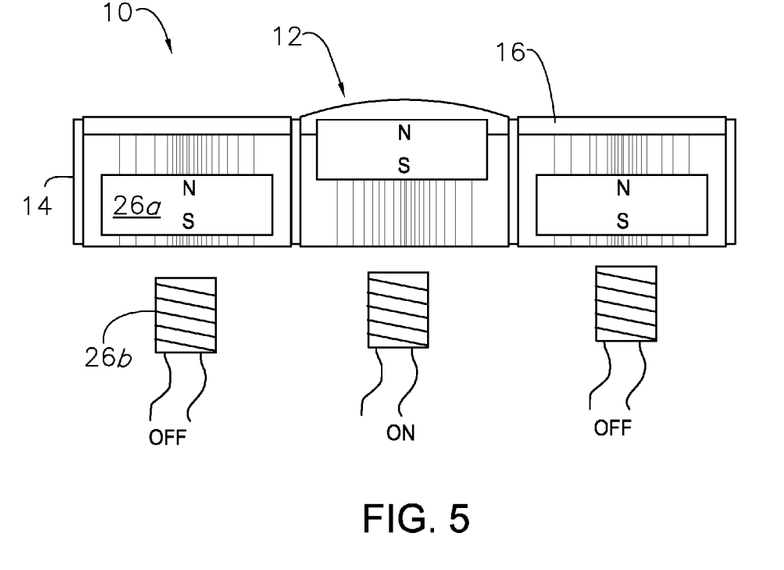
FIG. 5 is an elevation of an active texturing system including a plurality of partially enclosed cores, a permanent magnet fixedly engaged with each core, and an electromagnet relatively positioned so as to selectively influence and repel the permanent magnet, in accordance with a preferred embodiment of the invention.

As shown in FIG. 5, an additional cellular active surface embodiment can be achieved with the use of magnetic repulsion. For example, FIG. 5 shows a concept in which each cell 14 houses a permanent magnet 26*a* which can be moved within the cell 14 by an electromagnet 26*b* disposed within an influential zone external to the cell 14. In this embodiment pixel control is achieved by turning on and off single or groups of electromagnets 26*b* to move the corresponding permanent magnets 26*a*. An additional feature of a surface 12 made in this manner is the response time of the texture changes. As such, a further refinement of this embodiment comprises a top layer of SMP to lock the texture and thus reduce power requirement by maintaining the deformation when the electromagnets 26*b* are de-energized once the desired shape is fixed. The shape memorization capability of the SMP would also provide the reset to the default texture. In yet another embodiment, the electromagnets 26*b* and permanent magnets 26*a* are replaced by solenoids to achieve a similar texture control.

Figure 6:
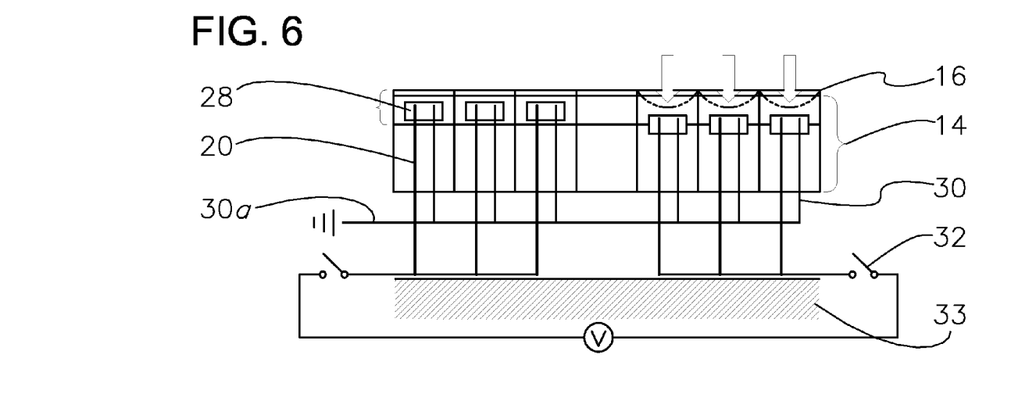
FIG. 6 is an elevation of an active texturing system including a plurality of partially enclosed cores having shape memory alloy wires disposed therein and drivenly engaged thereto, wherein the wires have a common mechanical and electrical ground, in accordance with a preferred embodiment of the invention.

Another embodiment utilizing a cellular core mechanism 14 is shown in FIG. 6, upon which is installed an elastic or flexible cover 16 that defines a surface 12, which bears an initial texture. To this structure 16 is adhered or embedded a crimp or other fastening device 28 to which an SMA wire 20 (FIG. 6) is mechanically and electrically attached, along with an electrical ground wire 30. Alternatively, it is again appreciated that the wire 20 may be passively activated by an ambient temperature gradient (e.g., heat load within the interior cabin of a vehicle, heat by-product produced by the vehicle engine, etc.). When heated (either electrically or otherwise) the SMA wires 20 will shrink in length with sufficient force and displacement to pull the elastic structure 16 down into the core 14*a*, creating a dimpled surface 12. Electrically, each SMA wire 20 may share a common ground 30*a*. Groups of SMA wires 20 may be jumped together and activated from a common switch 32, or can be individually addressed pixel-by-pixel. The elastic structure 12 presents sufficient stiffness such that the elastic energy stored in the deformation is enough to recover its initial position in the un-actuated state, as well as impart sufficient deformation to the SMA actuator 20 that another actuation cycle can take place without any other device or intervention. For example, a plexiglas cylinder may function as the mechanical ground 33 for the SMA wires 20, wherein a shunt wire connects the screw terminals and the ground wires 30 are jumped together so that a supplied current will actuate all wires 20 at the same time. The cellular core 14*a* may be a standard hexagonal aluminum core; and plastic tubing (not shown) may be inserted into the core 14*a* to prevent short-circuiting to the aluminum. The elastic structure 16 may be a silicone RTV adhesive extending 0.16 cm (i.e., 1/16th inches) from the core face and 0.32 cm (i.e., 1/8th inches) into the core 14*a*. The SMA wires 20 are crimped to their (individual) ground wire 30 and embedded into the uncured RTV adhesive during assembly, such that the surface deformation is approximately 0.25 cm (i.e., 0.1 inches) into the core 14*a* and is completely reversible and repeatable.

Figure 7:
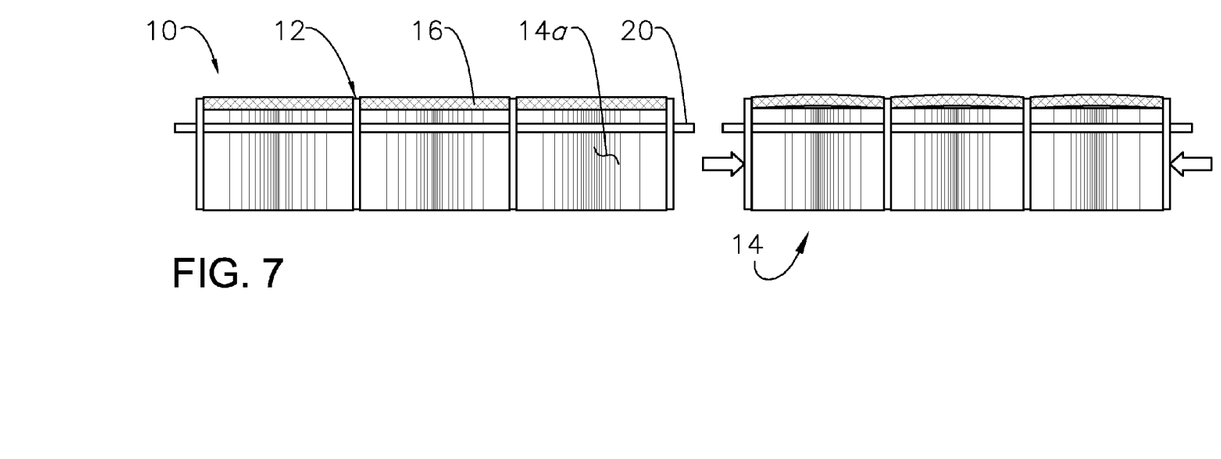
FIG. 7 is an elevation of an active texturing system including a plurality of partially enclosed cores having a diametrically traversing shape memory wire drivenly engaged thereto, in accordance with a preferred embodiment of the invention.

In another cellular example, an external actuator 20 may be used to laterally drive a change in cell shape. As shown in FIG. 7, for example, a Martensitic SMA wire 20 diametrically traversing a cell 14 may be selectively activated by heating the wire 20 past its transition temperature range, so as to cause the wire 20 to contract, and thereby laterally compress the cell 14. As a result the cell 14 is caused to longitudinally (into the plane of the figure for an open cell or vertically and into the plane of the figure for a sealed cell) expand, thereby producing bulging or wrinkling of the textured surface 12. It is appreciated that multiple cells 14 may be actuated simultaneously in this manner. For example, an SMA wire actuator 20 may be integrated across several cells 14 as shown in FIG. 7. In this configuration, the wire 20 need only be attached to the cells 14 at their outside or distal walls 18, where the cells 14 are adjacently configured and able to transfer the contractive force to neighboring cells 14.

Figures 8A, 8B, 8C, 8D, 8E:
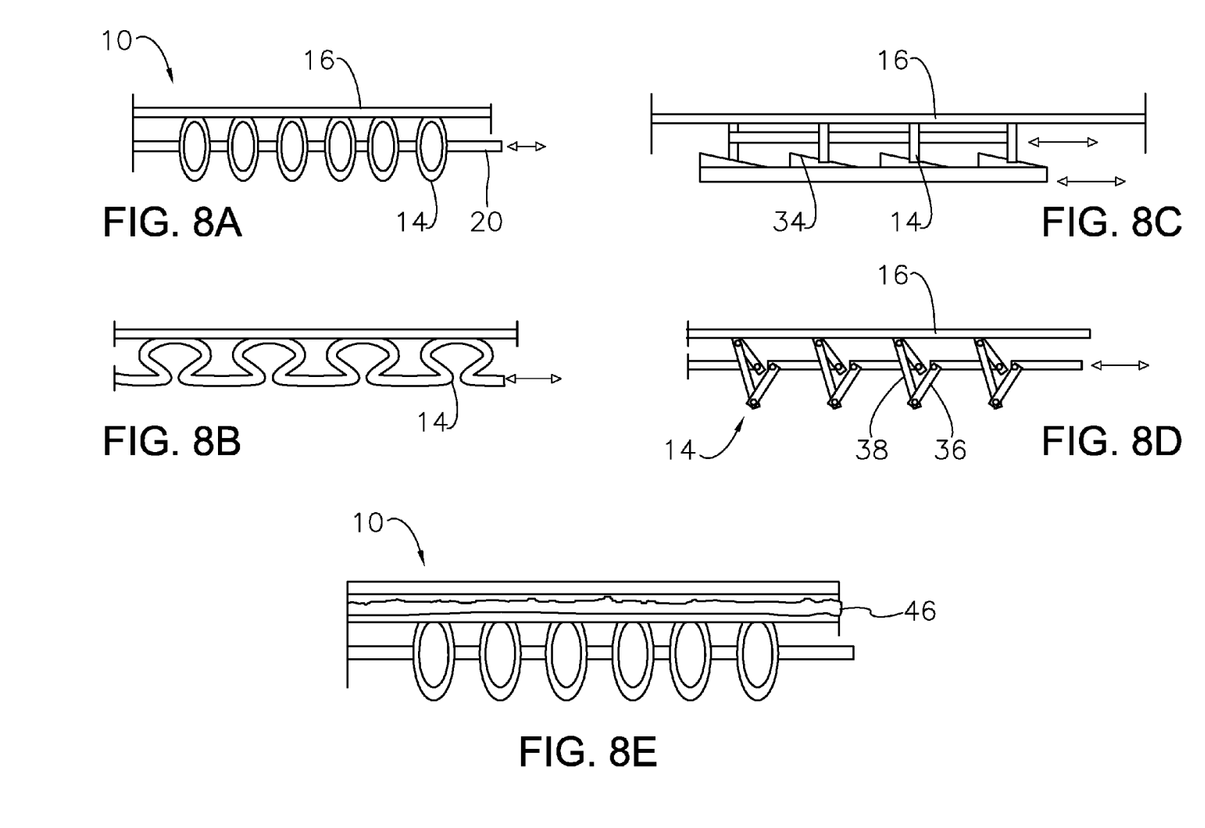
FIG. 8A is an elevation of an active texturing system including a plurality of discrete loop mechanisms communicatively coupled to a reconfigurable structure, in accordance with a preferred embodiment of the invention.
FIG. 8B is an elevation of a second embodiment of an active texturing system including a plurality of discrete loop mechanisms communicatively coupled to a reconfigurable structure, in accordance with a preferred embodiment of the invention.
FIG. 8C is an elevation of an active texturing system including a plurality of vertical members communicatively coupled to a reconfigurable structure defining a texture, and a bed of ramps disposed beneath the members, in accordance with a preferred embodiment of the invention.
FIG. 8D is an elevation of an active texturing system including a plurality of multi-bar linkage mechanisms communicatively coupled to a textured surface, in accordance with a preferred embodiment of the invention.
FIG. 8E is an elevation of an active texturing system shown in FIG. 8A, further including an intermediate layer disposed between the reconfigurable surface and discrete loop mechanisms, in accordance with a preferred embodiment of the invention.

Additional mechanistic embodiments include closed-cell structures or foams attached to a deformable surface to induce texture changes upon actuation (FIG. 8A), translating layers with topographical shaping, such that translation of a layer causes out-of-plane deformation in the surface to be actively textured (FIG. 8B), conventional linkage-type mechanisms attached to a deformable surface, where actuation of the input link causes a prescribed deformation in the surface (FIG. 8C), and a compliant mechanism substrate attached to a deformable surface material such that actuation of the substrate causes one or multiple distortions of the surface resulting in a change in surface texture (FIG. 8D). In these configurations, the elastic structure 16 is readily conformable so as to effect a change in texture as opposed to regional translation; alternatively, constraints (not shown) fixing the surface height in each of the spans between the locations at which the surface is being pushed upward or pulled downward by the actuator 20 may be provided. Similarly, the core structure may be an Auxetic core that expands laterally when elongated.

More particularly, in FIGS. 8A and 8B the discrete array of mechanisms 14 include a plurality of conformable loops (labeled as 14 in FIGS. 8A and 8B) that when stretched laterally present a second height less than their normal height, while the overlaying structure 16 presents a facilely reconfigurable elastic layer. The normal height is operable to produce a series of bumps in the surface 12 (FIG. 1), while the second height leaves the surface 12 flat and smooth. The mechanisms 14 are anchored at a first end, while an SMA or other actuator (not shown) is communicatively coupled to the loops at the opposite end, so as to selectively cause them to laterally stretch when energized. In FIG. 8C, the mechanism 14 includes a plurality of, preferably interconnected, vertical members (labeled as 14 in FIG. 8C), while the actuator 20 includes a bed of translatable ramps 34 disposed beneath the members. When the members engage the ramps 34 they are lifted due to engagement with the sloped surfaces defined thereby. By lifting the members, in a bed of nails manner, the surface texture is modified. In FIG. 8D, a more complex mechanism 14 is presented comprising a three-bar linkage system (labeled as 14 in FIG. 8D). Here, first and second outer bars 36 are connected to an actuator 20 and anchored at the opposite end. A central bar 38 is oriented so as to present a vertical component that engages the structure 16 and influences the surface 12. When the actuator 20 is energized the linkage is caused to laterally extend, thereby displacing the free outer bar 36. By doing so, the central bar 38 is caused to swing away from the surface 12, thereby reducing its influence, and the surface texture is modified accordingly.

Figure 9:
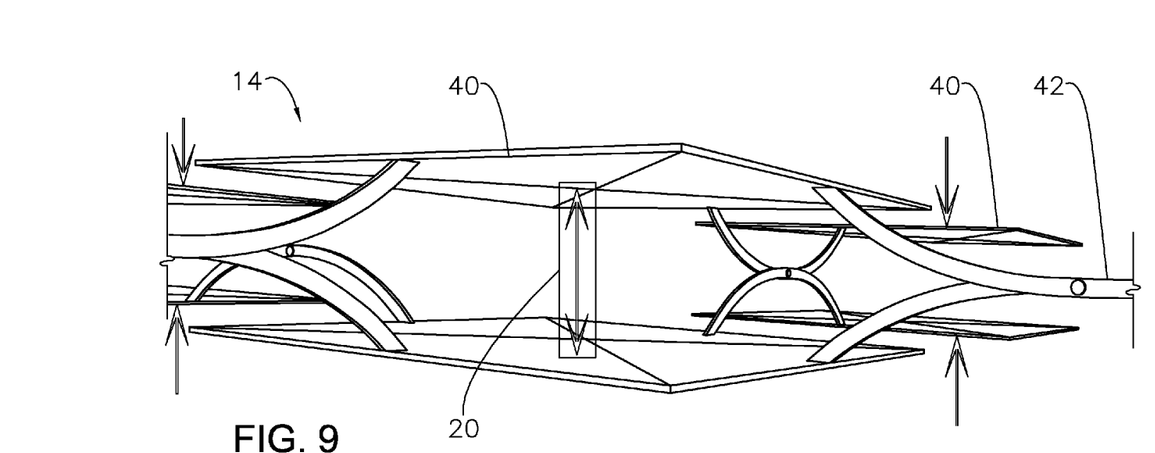
FIG. 9 is a perspective view of an active texturing system including a plurality of scissor-type mechanisms, further comprising first and second end caps defining a spacing, and first and second pivotal and opposite arches interconnecting adjacent sets of caps, in accordance with a preferred embodiment of the invention.
Figure 9A:
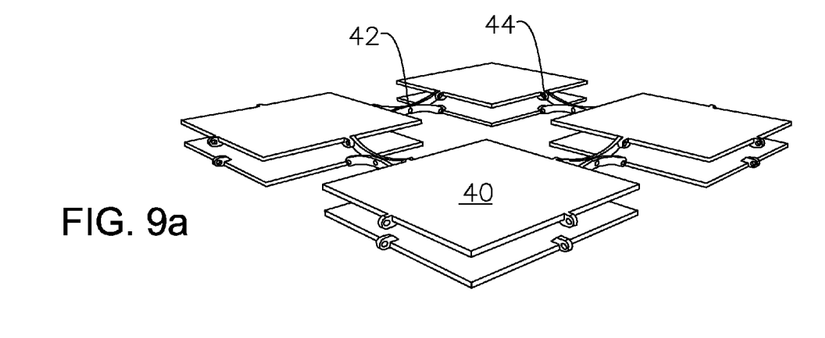
FIG. 9a is a perspective view of the system shown in FIG. 9, wherein the arches and caps define pivot connections, in accordance with a preferred embodiment of the invention.

Similarly, mechanistic structures can be employed to create more complicated surface texture changes. For example, a three-dimensional scissor-action mechanism (yet another example of mechanism 14) (FIGS. 9 and 9a) that undergoes an oscillating up and down motion between neighboring mechanisms 14, accompanied by an area change, may be employed. More particularly, in this configuration, the mechanism 14 includes first and second end "face sheets" or caps 40 fixedly coupled to a set a double arches 42 interconnected at their longitudinal centers, and pivotally coupled at their longitudinal centers. Each set of arches 42 are distally connected to the neighboring caps 40 as shown, such that when the arches 42 are caused to swing in either direction, one set of caps 40 will translate towards each other while the other set of caps 40 are further spaced. To facilitate motion, the arches 42 and caps 40 preferably define pivot connections 44 (FIG. 9a). Alternatively, the arches 42 and/or caps 40 may be flexible, so as to define "living hinges". An elastic structure 16 attached to either or both sides of the mechanisms 14 would deform likewise. The elastic structure 16 may further act as the restoring force when a particular mechanism 14 is deactivated. Additionally, an active material can be used to drive the mechanism 14. For example, an SMA wire or piezoelectric stack 20 may be erected in between the face sheets 40 for the motive force (FIG. 9).

Finally, it is appreciated that in either embodiment, variable texturing may be produced by altering the duration or amount of displacement, phase-change, magnetic repulsion, etc. experienced by the mechanism 14, and by varying the set of mechanisms 14 actuated; for example, in FIG. 8A, differing activation signals may be applied to the SMA wire 20 to effect differing loop heights followed by a maintenance signal operable to retain the desired texture, or engagement of a detent/locking mechanism (not shown).

Moreover, all of the above configurations may be modified by an intermediate layer 46 (FIG. 8E) that is caused to translate by the action of one or more mechanisms 14 to prescribe a specific texture or roughness to the surface 12.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

The terms "a" and "an" herein do not denote a limitation of quantity, but rather denote the presence of at least one of the referenced item. The suffix "(s)" as used herein is intended to include both the singular and the plural of the term that it modifies, thereby including one or more of that term. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. An engineered system for selectively modifying a texture of an exposed surface, said system comprising:
a reversibly reconfigurable structure defining the exposed surface and including a surface opposed thereto and physically engaged therewith;
an intermediate layer operatively connected to the opposed surface;
one or more discrete mechanisms shiftable between forms, physically engaged with the intermediate layer, and operable to mechanically reconfigure at least a portion of the intermediate layer, when shifting forms, so as to cooperatively modify the texture of the exposed surface, wherein each of the mechanisms includes a hollow cell including an at least partially enclosed core defined by a continuous lateral wall; and an actuator operatively coupled to each of the mechanisms and operable to selectively activate and deactivate each of the mechanisms, so as to cause each of the mechanisms to shift between forms, and reconfigure the portion of the intermediate layer.

2. The system as claimed in claim 1, wherein each of the cores is completely enclosed and hermetically sealed, and the cores further include a quantity of fluid entrapped within each of the cores.

3. The system as claimed in claim 1, wherein each of the cores is completely enclosed and hermetically sealed, and the cores further include a quantity of substance operable to absorb a radiation type.

4. The system as claimed in claim 1, wherein each of the cores is completely enclosed and hermetically sealed, and the cores further include a quantity of a Negative Poisson's Ratio material.

5. The system as claimed in claim 1, further comprising:
a permanent magnet disposed within each of the cores; and
an electromagnet selectively magnetized, and positioned relative to the permanent magnet, so as to selectively influence the permanent magnet.

6. The system as claimed in claim 1, wherein each of the cores further includes a quantity of a phase changing material, and each of the cores is reconfigured as a result of changing the phase of the material.

7. The system as claimed in claim 6, wherein each of the cores is completely enclosed and hermetically sealed, and the phase changing material is a quantity of water caused to selectively undergo electrolysis.

8. The system as claimed in claim 1, wherein the actuator includes at least one active material element operable to undergo a reversible change in fundamental property when exposed to or occluded from an activation signal, and said at least one active material element and mechanisms are cooperatively configured such that the change causes or enables each of the mechanisms to shift between forms and reconfigure the portion of the intermediate layer, and as a result, the texture of the exposed surface to modify.

9. The system as claimed in claim 1, wherein each of the mechanisms includes at least one selectively displaced magnet within the at least partially enclosed core.

10. The system as claimed in claim 1, wherein modifying the texture produces indicia.

11. The system as claimed in claim 1, wherein the actuator includes an active material selected from the group consisting of shape memory alloys, shape memory polymers, piezoelectric composites, magnetostrictive materials, electrostrictive materials, dielectric elastomers, and electroactive polymers.

12. The system as claimed in claim 11, wherein the actuator comprises a Martensitic shape memory alloy wire laterally coupled to each of the mechanisms, and activation of the wire causes each of the mechanisms to reconfigure.

13. The system as claimed in claim 12, wherein each of the mechanisms is drivenly coupled to a shape memory alloy wire, and the mechanisms share a common mechanical and electrical ground.

14. An engineered system for selectively modifying a texture of an exposed surface, said system comprising:
a reversibly reconfigurable structure including an elastic sheet, the elastic sheet defining the exposed surface and including a surface opposed thereto and physically engaged therewith;
an intermediate layer operatively connected to the opposed surface;
one or more discrete mechanisms, shiftable between forms, physically engaged with the intermediate layer, and operable to reconfigure at least a portion of the intermediate layer, when shifting forms, so as to cooperatively modify the texture of the exposed surface, wherein each of the mechanisms includes any of:
i) a plurality of reconfigurable loops defining a height, wherein at least one actuator is drivenly coupled to the reconfigurable loops and operable to laterally stretch the reconfigurable loops so as to decrease the height; or
ii) a plurality of vertical members, wherein the at least one actuator includes a bed of ramps disposed beneath the vertical members, and the ramps and vertical members are cooperatively configured and positioned such that the vertical members are lifted when the ramps are caused to laterally translate; or
iii) a multi-bar linkage including first and second outer bars attached to a central bar; and
the at least one actuator including an active material operable to undergo a reversible change in fundamental property when activated and deactivated, and communicatively coupled to each of the mechanisms and operable to activate and deactivate the mechanisms, so as to cause each of the mechanisms to shift between forms and reconfigure the portion of the intermediate layer.

15. The system as claimed in claim 1, wherein the actuator passively activates and deactivates each of the mechanisms, so as to cause each of the mechanisms to shift between forms, and reconfigure the portion of the intermediate layer.

16. The system as claimed in claim 14 wherein each of the mechanisms includes the multi-bar linkage, and wherein each of the multi-bar linkages includes:
the first and second outer bars operatively connected to the at least one actuator; and
the central bar between the first and second outer bars, the central bar i) to present a vertical component that engages the intermediate layer, and ii) to swing away from the intermediate layer when the first and second outer bars are displaced laterally in response to activation of the at least one actuator.

* * * * *